United States Patent
Kemppinen et al.

[15] 3,670,542
[45] June 20, 1972

[54] EXTRUSION METHOD AND APPARATUS

[72] Inventors: Auvo I. Kemppinen; Bobbie W. Strum, both of Richmond, Va.

[73] Assignee: Reynolds Metals Company, Richmond, Va.

[22] Filed: Dec. 4, 1969

[21] Appl. No.: 882,160

[52] U.S. Cl. .......................................... 72/8, 72/13, 72/253
[51] Int. Cl. ............................... B21b 37/12, B21c 23/00
[58] Field of Search ............................... 72/8, 9, 13

[56] References Cited

UNITED STATES PATENTS 2,863,557  12/1958  Murker .......................................... 72/9
3,212,309  10/1965  Wilson .......................................... 72/8

Primary Examiner—Charles W. Lanham
Assistant Examiner—R. M. Rogers
Attorney—Glenn, Palmer, Lyne, Gibbs & Thompson

[57] ABSTRACT

A determination is made of the portions of an extrusion ram's energy that is converted to heat at the segment of the billet adjacent the die. This is then used to predict the exit temperature of the extruded piece. The predicted exit temperature is compared with a desired exit temperature and the ram speed is adjusted accordingly so that the workpiece is substantially continuously extruded at the desired temperature.

17 Claims, 4 Drawing Figures

INVENTORS
Auvo I. Kemppinen
Bobbie W. Strum

BY
Glenn, Palmer, Lyne, Gibbs & Thompson
ATTORNEYS 3,670,542

EXTRUSION METHOD AND APPARATUS

BACKGROUND OF THE INVENTION

It has long been recognized that the exit temperature of an extrusion is critical to both the quality of the extruded product and the production rate of the extrusion apparatus. In this respect, particular extrusion temperatures are not only required to obtain product uniformity, but such extrusion operations are frequently followed by quenching which must take place within critical temperature limits. Hence, many devices have been used to measure such exit temperatures and vary certain extrusion press parameters so as to bring the exit temperature into agreement with that which is desired.

U.S. Pat. No. 2,863,557 to Munken, for example, describes an extrusion method wherein the temperature of the extrusion is detected as it leaves the die; and the speed of the ram is then varied so as to bring the detected temperature into agreement with the desired temperature. Vibrations, smoke, stray reflections, and the like, however, have caused frequent inaccuracies in the detection of die exit temperatures. Moreover, for practical reasons, it has been necessary to locate the exit temperature detecting devices some distance from the extrusion die. For example, the detector cannot be permitted to contact the extrusion because it would cause scratches. Hence, there is an undesirable delay in the feedback to the ram speed control so as to result in a non-uniform product. Consequently, it is an object of this invention to provide an extrusion method and apparatus for more accurately controlling the die exit temperature of the workpiece. In this respect, in accordance with the invention's broader aspects this object is accomplished by predicting the exit temperature of the workpiece just prior to its acutal emergence from the die, so that the ram speed can be substantially simultaneously adjusted to raise or lower the actual exit temperature of the workpiece to that which is desired.

In connection with steel rolling mills it has been suggested that the entry temperature of a workpiece be measured and its speed set in accordance with a predetermined formula so as to arrive at a predicted finish temperature. For example, the 1960 AISE Yearbook describes formulas for determining the speed at which a billet of given entry temperature and thickness should be driven in order to obtain a desired finish temperature. Operations based on such predictions, however, have not been satisfactory. This is primarily because they have been both pre-programmend and merely based on entry temperature of the billet itself. Hence, there has been inadequate account for the ambient heat losses occurring under varying operating conditions such as are particularly the case in extrusion operations where exit temperatures vary in accordance with the shape of the die that is being used at any given time. In fact, as noted in U.S. Pat. No. 3,418,834, even steel rolling mills revert to the Munker-type method of finish temperature control as soon as the initial portions of a strip pass through the mill's various rolling stands. Hence, the predictive temperature aspects of strip mill operations are only used as a first approximation and not as a continuous control.

Control operations based on temperature measurements of the workpiece are additionally difficult in extrusion presses, because the exit temperature of the extruded piece is not always uniform. Recent testing in connection with the extrusion of a "hard" aluminum alloy (5083), for example, indicated an exit temperature fluctuation of almost 100° F. not withstanding the use of modern equipment including an infrared output-temperature sensor whose output, after comparison with a desired output temperature, was used to control the press's ram speed. It is apparent from such a wide variation in extrusion output temperature, therefore, that even with the most modern equipment, it is difficult to maintain the minimum temperature necessary for a good quench, but less than that which causes surface tearing and deterioration, or excessive re-crystallization of the extruded product's surface layers. Hence, a more specific object of the invention is to provide such a method and apparatus whereby the exit temperature of the extruded piece is not only predicted, but the prediction is subject to continuous change in accordance with changing operating conditions for various workpiece operations.

Inasmuch as the method of the invention provides much closer control of exit temperature than has been previously available, other advantages stem from the invention in addition to those described above. In this respect, the ram can be run faster which both permits a higher temperature rise in the billet container and increases production. Moreover, because of the higher temperature rise in the container, the input billet temperature can be lower so as to effect still further savings of time and energy.

In accordance with principles of the invention a desired die exit temperature is selected and a determination is made of the input energy being exerted on the billet at any given time by the ram. A determination is then made of the portion of the ram's input energy that is being converted into heat in the segment of the billet immediately adjacent the die; and the remainder is apportioned among the other billet segments. This extrusion-segment portion of the ram's input energy is used to predict the extruded piece's die exit temperature which is then compared with the desired temperature so that the speed of the ram can be varied in accordance with the difference between the two temperatures so as to result in a substantially isothermal extrusion temperature that is within acceptable limits of that which is desired.

DRAWINGS

The foregoing and other objects, features, and advantages of this invention will be apparent from the following more particular description of preferred embodiments thereof as illustrated in the accompanying drawings wherein the same reference numerals refer to the same parts throughout the various views. The drawings are not necessarily intended to be to scale, but rather are presented so as to illustrate the principles of the invention in clear form.

DETAILED DESCRIPTION

Figure 1:
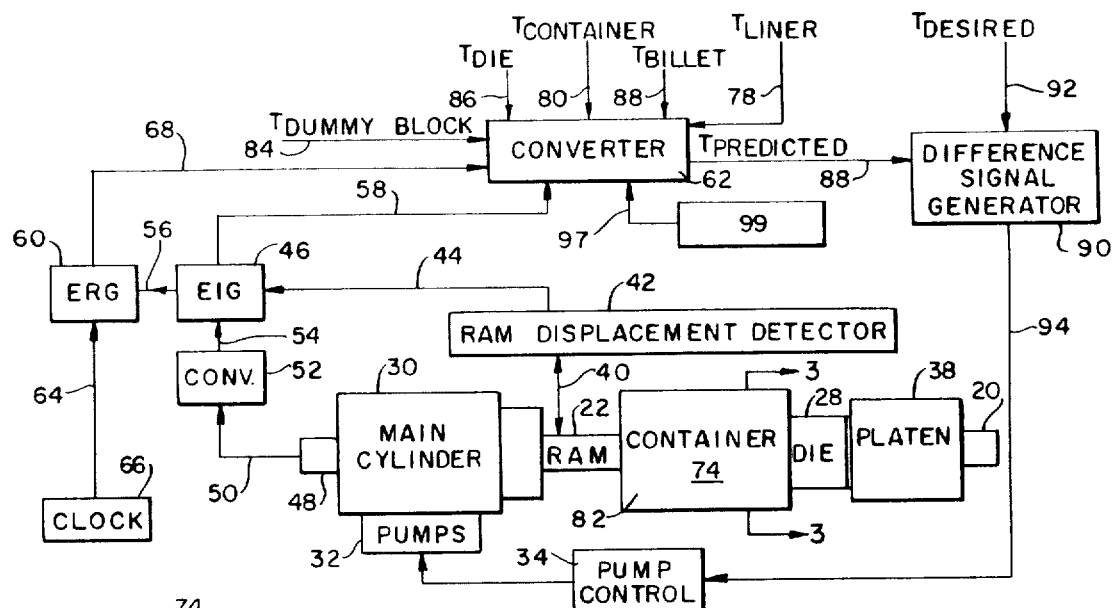
FIG. 1 is a schematic block diagram of apparatus embodying the invention.

With reference to FIG. 1 an extruded piece 20 is obtained in a conventional direct extrusion manner by using a ram-type feeding means 22 to force a billet 24 (FIG. 2) through a die element 26 in a die housing 28. Similarly conventionally the ram 22 is hydraulically driven by a main cylinder 30 supplied with hydraulic pressure by pumps 32 which are operative in response to a pump control 34 to vary their output. In this manner, the main cylinder forces the ram against a dummy block 36 (FIG. 2) which in turn, causes the billet to pass through the die and a conventional platen 38 and onto a run-out table, not shown. The invention is also applicable to indirect extrusion apparatus but such applications will be apparent to those skilled in the art and will not be further discussed.

The displacement of the ram is measured by a ram displacement detector which is schematically illustrated as elements 40 and 42 in FIG. 1. A signal from the ram displacement detector is delivered on line 44 to an energy input signal generator 46. A pressure transducer 48 senses the main cylinder pressure and delivers a signal representative thereof on line 50 to a converter 52 which converts the main cylinder pressure signal to a ram pressure signal representative of the pressure on the ram. This signal is delivered on line 54 to the energy input signal generator 46. Output signals from the energy input signal generator represent the work of the ram 22 upon the billet 24 and are delivered on lines 56 and 58 to an energy rate signal generator 60 and a converter 62, respectively. In this respect, as will be described more fully shortly, it is intended that the converter be operated in accordance with the method of the invention and can be comprised, for example, of a series of complex weighing circuits; fluid logic circuits; or some other means of rapid calculation such as a computer. The energy rate signal generator 60 also receives a series of clock impulse signals on line 64 from a clock 66 and produces a signal on line 68 representative of the rate at which the ram applies extrusion energy to the billet 24 to form the extruded workpiece 20.

Figure 3:
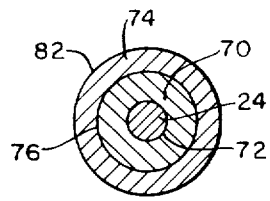
FIG. 3 is a sectional view through a billet container taken along the lines 3—3 in FIG. 1.

As shown in FIG. 3 the billet 24 is surrounded by a liner 70 to form a billet-liner interface 72. Similarly, the liner is surrounded by a container 74 to form a liner-container interface 76. Temperature transducers deliver signals on lines 78 and 80 representative, from the container, of the temperature of the container-liner interface ($T_{liner}$) and the temperature of the outer surface of the container 82, respectively. Similarly, the converter receives signals from other container transducers on lines 84, 86, and 88 representing the temperatures of the dummy block 36, the die 26, and the billet 24, respectively. In this regard it should be noted however that dummy block and die temperature need not be actually measured if suitably accurate historical data is available for use in connection with dummy block and die temperature input signals.

The converter 62 is operative in response to receipt of the above described signals to produce an output signal representing the predicted temperature at which the next segment of the extruded workpiece will leave the die 26. The converter 62's output signal is delivered on line 88 to a difference signal generator 90 which is operative in response to receipt of the "predicted temperature signal" and a "desired temperature signal" on line 92 to produce a signal on line 94 representative of the difference between the current ram speed and the ram speed that is necessary to produce an extrusion temperature equal to that which is desired. This speed difference signal on line 94 is delivered to the pump control 34 which adjusts the output of the pumps 32 to effect the desired change in the speed of the ram 22. Consequently, not only does the above described structure predict the die exit temperature of the workpiece 20, but it continually changes the temperature prediction in accordance with changing operating conditions and controls the ram speed so as to continually change the die exit temperature in a direction to make it more nearly correspond with the desired temperature. In this manner, the ram is permitted to operate at its maximum speed to develop the maximum temperature rise within the billet container without exceeding the "hot short" temperature values that are required for uniformly good extrusion surface qualities and grain structures. Of course, this also permits the use of lower input billet temperatures while nevertheless maximizing production.

Figure 2:
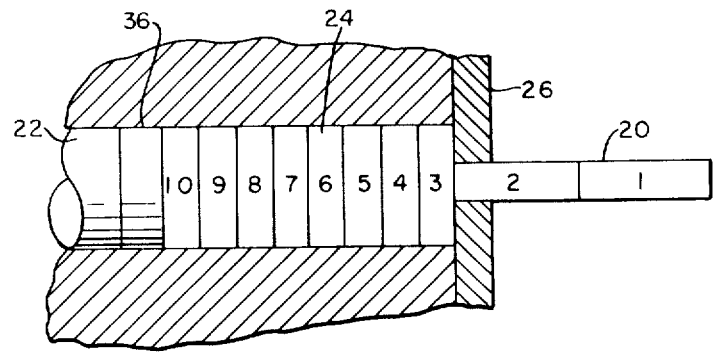
FIG. 2 is a schematic fragmentary sectional view through a billet container.

One method of analyzing the heat flow in an extrusion billet has been described by Akeret in an article beginning at Page 204 of the 1967 Journal of the Institute of Metals and entitled, "A Numerical Analysis of Temperature Distribution in Extrusion." In accordance with that method the billet is divided into segments such as those labeled 1, 2, 3 and so on in FIG. 2. Ideally, the thickness of each segment would correspond to that of the total volume of material being deformed at any given time. Particularly, in hot extrusion, however, the entire billet undergoes sheer throughout the extrusion cycle. Hence, an "ideal thickness" is not susceptible to acurate definition. During the practice of the instant invention, however, it has been found that quite acceptably accurate results have been obtained by assuming that about 77-82 percent of the deformation occurs in the first billet segment adjacent the die. At the instant of time during an extrusion cycle as illustrated in FIG. 2, for example, segment three is adjacent the die. Hence, about 77-82 percent of the billet's deformation is assumed to be taking place in segment three. The thickness of a given segment can be varied over somewhat of a range, but a segment thickness of twice that of a cone encompassing the Avitzur semi-cone angle has been found to be preferable. Avitzur semi-cone angles are more fully described in paper no. 64 (Prod-10) of the 1964 Transactions of the American Society of Mechanical Engineers entitled, "Analysis of Metal Extrusion." Generally, however, an Avitzur semi-cone angle is the angle between the axis of extrusion and the dead metal zone surface. The dead metal zone surface is the line of demarcation between the dead metal zone and deformation zone.

Once the size of the deformation segment is determined, it is necessary to estimate the portion of the ram's energy that is used to cause such deformation. In this respect, it is assumed that all of this deformation energy is converted to heat; and a heat balance is conducted to determine the extent to which the thusly generated heat is used to increase the temperature of the extrusion segment (three in FIG. 2) and the extent to which such heat is transferred to the die, liner, container, dummy block, and ram.

Figure 4:
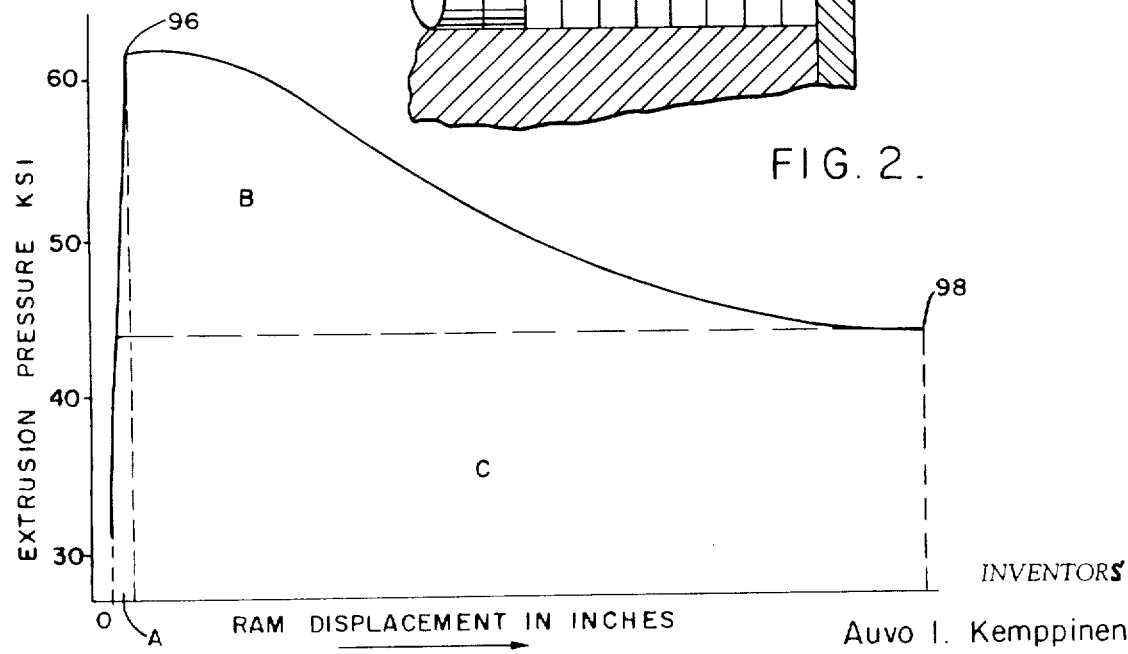
FIG. 4 is a graph illustrating certain aspects of the method of the invention.

FIG. 4 is a graph illustrating the variations in ram pressure with displacement of the ram for a typical extrusion operation. The ram pressure very rapidly increases from zero to a maximum at point 96 in FIG. 4 and then gradually decreases to a final pressure at point 98. Hence, the area under the curve defined by line 96-98 represents the work of the ram 22 during a power stroke except for the small wedge shaped area A which represents the work of the ram devoted to upsetting the billet to conform to the dimensions of the container's liner. As will be described more fully shortly, the area B represents surface heat generation. That is, the portion of the ram's energy that is used to overcome shearing of the billet's surface; and the area C is considered to represent internal heat generation. That is, the portion of the ram's energy that is used to overcome the resistance to perforation of the billet material and redundant work. Hence, all of the area under the curve can be considered to be converted to heat, as a good approximation of the amount of heat generated during extrusion.

Planimetric measurements of curves such as FIG. 4 in the manner described above, indicate that between about 7 to 17 percent of the ram's energy is expended in either upsetting the billet to conform to the shape of the billet-liner or overcoming shear and friction between the billet and its container. It has also been found, however, that about an additional 6-11 percent of the ram's energy is used in what is theorized as being merely redundant work which simultaneously takes place thorughout the length of the billet. In any event, most satisfactory results have been obtained when it has been assumed that a range of between 77-82 percent of the ram's input energy is spent on deformation of the segment about to be extruded, i.e., segment three in FIG. 2 shown to be adjacent to the die.

Insofar as the heat balance aspects of the invention are concerned, standard heat transfer techniques are applied as will be described in more detail in connection with an example of the method of the invention when applied to a given extrusion alloy.

EXAMPLE

Structure corresponding to that illustrated in FIG. 1 was charged with 6063 aluminum alloy. The billet temperature was 950° F.; and the container temperature was 800° F. at the time the extrusion stroke began with a ram speed of 10 inches per minute.

A test billet was extruded using the outputs from lines 54 and 44 to obtain a graph similar to that illustrated in FIG. 4. A polynomial was then constructed from the pressure curve to represent the amount of heat generated in the various extrusion segments. In this respect, the surface shear and redundant work energy represented by the area B was attributed to the various billet segments at any given time; the area C was attributed to internal heat generation as noted above; and the portion of the friction energy attributable to the extrusion segment (three in FIG. 2) was considered to be converted to heat in that segment. As noted above, it has been determined that the energy spent on deformation in the First segment (three in FIG. 2) is in the range of 77–82 percent of the ram's input energy. Similarly, the planimetric measurements indicated that about two per cent of the ram's energy was used to crush or upset the billet to conform to the dimensions of the liner as represented by area A in FIG. 4.

Suitable heat transfer coefficients were then used to determine the portion of the extrusion segment's heat that was passed on to its surroundings. In this respect, the Akeret publication sets forth several suitable coefficients; and ASTM Special Technical Publication No. 227 sets forth the thermal properties of several types of metals. In connection with the instant example a value of 125 Btu/Hr/Ft²/degrees F was used as the heat transfer coefficient between the billet and the liner. The die temperature was found to be 1,000° F.; and the dummy block began the extrusion stroke at 350° F. and ended at 550° F. As will be noted more fully shortly it is not necessary to use heat transfer coefficients as such. That is, it is sometimes convenient to use the conductivity ratios of the billet material and the material surrounding it, for example.

The container was heated with resistance heaters, but additional heat flowed into the container from the billet. Hence, a temperature gradient existed across the container. The hottest point was at the liner-billet interface which, of course, would be quite difficult to measure. Hence, as noted in connection with the foregoing descriptions of FIGS. 1 and 3, the container's temperatures were merely measured at the outside of the container ($T_{container}$, the signal for which is delivered to the converter 62 on line 80); and at the liner-container interface ($T_{liner}$, the signal for which is delivered to the converter on line 78).

Standard equations for the conduction of heat through a composite cylinder wall were then used to determine the temperature of the billet-liner interface. In this respect, the $T_{liner}$ temperature was 860° F.; the outer container temperature was 402° F.; the container's outside diameter was 39 inches; the liner's outside diameter was 14 inches; and its inside diameter (billet diameter) was 10.25 inches. From these figures, the composite-cylinder-wall formulas indicated that the billet-liner interface temperature was about 969° F.

Prior to continuing the above example in terms of its more specific application to the structure of FIG. 1, there will first be set forth some equations of a type which are suitable for use in connection with the determination of heat flow between the various billet segments and their surroundings.

The general equation for non-steady state linear heat transfer is:

$$Q + \frac{\partial^2 T}{\partial x^2} = \frac{\rho c}{K} \frac{\partial T}{\partial t} \qquad (1)$$

Where Q is the internal heat generated, T is temperature, x is the segment thickness, $\rho$ is the density, c is the specific heat, K is the thermal conductivity, and t represents time. Equation (1) can be written in the following form to solve for the temperature of given internal billet segments for a given time interval:

$$T_i^{j+1} = T_i^j \left[ 1-(2+a) \frac{\alpha \Delta t}{\Delta x^2} \right] + \frac{\alpha \Delta t}{\Delta x^2} [T_{i-1}^j + T_{i+1}^j + aT_{a1}^j] \qquad (2)$$

Where $i$ represents a given billet segment; $j$ represents a given instantaneous value of time; $T_i$ is the temperature of the given internal segments in FIG. 2 and $\alpha$ is a dimensional constant representing thermal diffusivity, and $$a = \frac{2 \Delta x^2}{r_i^2 \text{Ln} \frac{r_o}{r_i}} \cdot \frac{K_s}{K_b} \qquad (3)$$

Wherein $r_i$ is the billet radius, $r_o$ is the outside radius of the container, $K_s$ is the conductivity for the tool steel, and $K_b$ is the thermal conductivity for the billet material.

For purposes of stability, the coefficient of $T_i^j$ should be positive. Hence, the second term of the coefficient should be less than one.

Similarly, Equation (1) can be rewritten as follows to represent the temperature for the next time interval ($j+1$) for the segment in contact with the die ($i=3$ in FIG. 2):

$$T_i^{j+1} = \frac{\alpha \Delta t}{A \Delta x} \frac{Q}{K_b} + \frac{\alpha \Delta t}{\Delta x^2} [T_{i+1}^j + aT_{a1}^j + N_1 T_{a2}^j]$$
$$+ T_i^j \left[ 1 - \frac{\alpha \Delta t}{\Delta x^2}(1+a+N_1) \right] \qquad (4)$$

Where Q is the amount of heat generated by deformation in the segment about to be extruded, $T_{a2}$ is the temperature of the die, and $K_b$ is the thermal conductivity for the billet material, A is the cross sectional area of the billet segment, and $$N_1 = \frac{K_s \Delta x}{L_d K_b} \qquad (5)$$

where $L_d$ is the thickness of the die.

Again, for purposes of stability, the coefficient, of $T_i^j$ should be positive. Hence, the second term of its coefficient should be less than 1.

The equation for the temperature of the last segment is substantially the same as that for the segment about to be extruded except that no heat is generated internally, and the heat transfer coefficient should be suitable for defining heat transfer between the last segment and the dummy block.

The above equations are merely illustrative of many that could be written to more or less specifically define the transfer of heat from the billet. For example, the above equations are written in terms of conductivities and the relative dimensions of the billet segments and adjacent structures. As noted above, they could also be written in terms of heat transfer per se.

Signals representing the various temperatures in the above or similar equations are illustrated in FIG. 1 as being entered into the converter 62. The converter is also provided with an input representing the various constants on line 97 from an input device 99. In this respect, the input device should be of a type which is suitable for selectively changing its output signal on line 97 in accordance with selected changes in the various constants. For example, if it is desired that the segment thickness be changed, the input device 97 should be adapted to modify its output signal on line 97 accordingly.

By virtue of the energy input signal on line 58 and the energy rate signal on line 68, the converter is operative to account for the "constant" signal on line 97 and the various temperature signals to produce its signal on line 88 representative of the predicted die exit temperature of the segment about to be extruded. If this predicted temperature varies more than a predetermined amount from that which is desired, the signal difference generator 90 produces a signal on line 94 which results in a modification of the ram speed in the manner described above to result in an actual extrusion exit temperature that is within controllable limits of that which is desired.

For example, when the method and apparatus of the invention is used to extrude billets of the 6063 aluminum alloy discussed above, the predicted exit temperatures varied from the measured temperatures by a maximum "error" of 3.8 percent and most of the time the error was only 2 percent or less. Actual predicted and measured temperatures for this example are set forth in Table I for various ram displacements.

TABLE 1

| Ram Disp.(inches) | Predicted temp. (° F.) | Measured temp. (° F) |
|---|---|---|
| 3 | 1082 | 1104 |
| 5 | 1082 | 1104 |
| 7 | 1082 | 1100 |
| 9 | 1081 | 1100 |
| 11 | 1080 | 1095 |

| 13 | 1078 | 1085 |
| 15 | 1078 | 1082 |
| 17 | 1077 | 1082 |
| 19 | 1075 | 1079 |
| 20 | 1072 | 1078 |
| 21 | 1066 | 1070 |

In this respect, it will be appreciated that the predicted temperatures are in substantial agreement with the measured temperatures, particularly when it is considered, as initially noted, that the measured temperatures themselves are not entirely accurate even though the temperature measurements are made with equipment having greater sophistication and accuracy than would normally be used on a production line basis. Hence, it is not unreasonable to include that the predicted temperatures are indeed more definitive of the actual exit temperature than are the measured temperatures. Consequently, the method and apparatus of the invention are not only able to adjust an extrusion ram's speed prior to the time that a given segment is actually extruded, but the rate adjustment itself is based upon a temperature that is more accurate than that which has previously been obtainable after a given segment has been extruded.

While the invention has been particularly shown and described with reference to a preferred embodiment thereof, it will be understood by those skilled in the art that various changes in form and details may be made without departing from the spirit and scope of the invention. For example, although the various aspects of the invention have been described in relation to the extrusion of aluminum, the invention is equally applicable to the extrusion of other metals and alloys as well. Similarly, although the invention has been described in terms of analog values, it will be appreciated that analog to digital conversion can be effected so that for example, the pumps 22 can be digitally controlled; and, although the invention has been described in terms of a direct extrusion process, it is equally applicable to indirect extrusion processes where the billet is stationary and the die is moved. In such an event, however, there is no area such as B in FIG. 4 because the surface shear is excluded.

The embodiments of the invention in which an exclusive property or privilege is claimed are defined as follows.

We claim:

1. An extrusion apparatus comprising:
   an extrusion system wherein variable speed feeding means causes relative motion of a container held billet with respect to a die to form an extruded piece;
   predicted exit temperature signal means for substantially continuously generating a current predicted exit temperature signal representing the current predicted exit temperature of said extruded piece at substantially any given time during the extrusion of said piece, said predicted exit temperature signal means including means for delivering selected instantaneous container temperature signals to said predicted exit temperature signal means, said predicted exit temperature signal means being operative in response to said instantaneous container temperature signals to generate said predicted exit temperature signal; and,
   control means connected to said predicted exit temperature signal means for adjusting the speed of said feeding means so that the predicted die exit temperature of said extruded piece is substantially continuously changed toward a desired predetermined value.

2. The apparatus of claim 1 wherein said control means includes:
   means for generating a desired exit temperature signal representing said predetermined desired value of said exit temperature;
   means for comparing said predicted exit temperature signal with said desired exit temperature signal and generating a difference signal representing the difference therebetween; and,
   means operative in response to said difference signal for varying the speed of said feeding means so that the actual die exit temperature of said extruded piece is changed in a direction tending toward said desired temperature.

3. The apparatus of claim 2 wherein said predicted exit temperature signals means also includes:
   means for generating an input energy signal representing the work of said feeding means upon said billet; and,
   means operative in response to receipt of said input energy signal for generating an energy rate signal representing the rate at which said feeding means applies extrusion energy to said billet, said predicted exit temperature signal means being operative in response to said energy rate signal and said input energy signal as well as said instantaneous container temperature signals to generate said predicted exit temperature signal.

4. The apparatus of claim 3 wherein said input energy signal generating means includes displacement signal generating means for generating a signal representing the displacement of said feeding means; and
   pressure signal means for generating a signal representing the pressure of said feeding means on said billet; said input energy signal means being operative in response to receipt of said displacement signal and said pressure signal to generate said input energy signal.

5. The apparatus of claim 3 including a clock means for generating time signals and delivering said time signals to said energy rate signal means, said energy rate signal means being operative in response to said time signals and said input energy signals to generate said energy rate signals.

6. The apparatus of claim 5 wherein said input energy signal generating means includes displacement signal generating means for generating a signal representing the displacement of said feeding means; and
   pressure signal means for generating a signal representing the pressure of said feeding means on said billet; said input energy signal means being operative in response to receipt of said displacement signal and said pressure signal to generate said input energy signal.

7. The apparatus of claim 3 wherein said billet includes a segment adjacent said die and wherein said predicted exit temperature signal means includes means for conducting a heat balance on said segment to determine the temperature of said segment resulting from application thereto of said input energy.

8. The apparatus of claim 7 wherein said input energy signal generating means includes displacement signal generating means for generating a signal representing the displacement of said feeding means; and
   pressure signal means for generating a signal representing the pressure of said feeding means on said billet; said input energy signal means being operative in response to receipt of said displacement signal and said pressure signal to generate said input energy signal.

9. The apparatus of claim 7 including a clock means for generating time signals and delivering said time signals to said energy rate signal means, said energy rate signal means being operative in response to said time signals and said input energy signals to generate said energy rate signals.

10. The apparatus of claim 8 wherein said input energy signal generating means includes displacement signal generating means for generating a signal representing a displacement of said feeding means; and
    pressure signal means for generating a signal representing the pressure of said feeding means on said billet; said input energy signal means being operative in response to receipt of said displacement signal and said pressure signal to generate said input energy signal.

11. The apparatus of claim 10 wherein said segment has a thickness of about twice that of a cone encompassing the segment's Avitzur semi-cone angle.

12. The apparatus of claim 7 wherein said segment has a thickness of about twice that of a cone encompassing the segment's Avitzur semi-cone angle.

13. A method of extrusion of a billet wherein a ram causes relative motion of said billet through a die, said method comprising the steps of:
selecting a desired die exit temperature at which it is desired to have the extruded piece exit from said die;
determining the input energy being exerted on said billet at any given time by said ram;
determining the portion of said input energy that is being converted into heat at said given time in said billet;
predicting the die exit temperature of said extruded piece resulting from the heat rise in said billet;
comparing the predicted die exit temperature with the desired die exit temperature at said given time; and,
adjusting the speed of said ram in accordance with the difference between said predicted die exit temperature and the desired die exit temperature.

14. The method of claim 13 wherein said billet includes an extrusion segment adjacent said die and includes the steps of:
apportioning a predetermined amount of said input energy to said extrusion-segment; and
predicting said die exit temperature on the basis of the resulting heat rise in said extrusion-segment.

15. The method of claim 14 wherein said predetermined amount of input energy that is apportioned to said extrusion-segment is between about 77 and 82 percent.

16. The method of claim 14 wherein said extrusion segment has a thickness of about twice that of a cone encompassing the Avitzur semi-cone angle.

17. The method of claim 16 wherein said predetermined amount of input energy that is apportioned to said extrusion-segment is between about 77 and 82 percent.

* * * * *